United States Patent
Xu et al.

(10) Patent No.: US 12,156,310 B2
(45) Date of Patent: Nov. 26, 2024

(54) OPTICAL SOURCE SWITCHING METHOD AND APPARATUS

(71) Applicant: HUAWEI TECHNOLOGIES CO., LTD., Shenzhen (CN)

(72) Inventors: Benbo Xu, Shenzhen (CN); Yanbo Li, Dongguan (CN); Zhen Dong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 18/187,817

(22) Filed: Mar. 22, 2023

(65) Prior Publication Data

US 2023/0239982 A1 Jul. 27, 2023

Related U.S. Application Data

(63) Continuation of application No. 17/540,699, filed on Dec. 2, 2021, now Pat. No. 11,877,368, which is a
(Continued)

(30) Foreign Application Priority Data

Jun. 3, 2019 (CN) .......................... 201910477070.9

(51) Int. Cl.
*H04B 10/032* (2013.01)
*G02B 27/10* (2006.01)
(Continued)

(52) U.S. Cl.
CPC ......... *H05B 47/105* (2020.01); *G02B 27/108* (2013.01); *H04B 10/032* (2013.01); *H04Q 11/0001* (2013.01)

(58) Field of Classification Search
None
See application file for complete search history.

(56) References Cited

U.S. PATENT DOCUMENTS 4,436,365 A * 3/1984 Hodgins ............ H04B 10/2587
385/12
6,324,318 B1 11/2001 Suzuki
(Continued)

FOREIGN PATENT DOCUMENTS

| CN | 1215268 A | 4/1999 |
| CN | 1914453 A | 2/2007 |

(Continued)

OTHER PUBLICATIONS

"Fiber Optics Solutions", Coupler and Splitter Overview, 2016 (Year: 2016).*
(Continued)

*Primary Examiner* — Jai M Lee
(74) *Attorney, Agent, or Firm* — Maier & Maier, PLLC (57) ABSTRACT

An optical source switching apparatus including first optical sources, an optical cross-connect device, second optical sources, and a first coupler. The optical cross-connect device is connected to the first optical sources and the first coupler, and the first coupler is connected to the second optical source; both the first optical source and the second optical source are configured to output continuous optical energy, and the optical cross-connect device is configured to enable optical energy output by at least one of the first optical sources to enter the first coupler when at least one of the second optical sources fails; and the first coupler is configured to implement beam splitting of the optical energy output by the first optical source or the second optical source.

21 Claims, 6 Drawing Sheets

Related U.S. Application Data continuation of application No. PCT/CN2020/083401, filed on Apr. 5, 2020.

(51) Int. Cl.
*H04Q 11/00* (2006.01)
*H05B 47/105* (2020.01)

(56) References Cited

U.S. PATENT DOCUMENTS

| | | | | |
|---|---|---|---|---|
| 6,396,586 | B1* | 5/2002 | Wei | H04B 10/2507 |
| | | | | 356/479 |
| 7,447,446 | B2* | 11/2008 | Aoki | H04J 14/0297 |
| | | | | 398/91 |
| 7,539,423 | B2* | 5/2009 | Robinson | H04B 10/504 |
| | | | | 398/208 |
| 8,072,669 | B2* | 12/2011 | Zhou | H04B 10/541 |
| | | | | 359/279 |
| 9,319,758 | B2* | 4/2016 | Goswami | H04Q 11/0067 |
| 9,668,036 | B2* | 5/2017 | Wellbrock | G02B 6/4286 |
| 10,277,312 | B2* | 4/2019 | Xue | H04B 10/079 |
| 10,374,699 | B2* | 8/2019 | Ji | H04Q 11/00 |
| 10,812,181 | B2* | 10/2020 | Xu | H04B 10/40 |
| 11,877,368 | B2* | 1/2024 | Xu | H04Q 11/0005 |
| 2013/0051722 | A1 | 2/2013 | Hsiao | |
| 2018/0284240 | A1 | 10/2018 | LaChapelle et al. | |
| 2019/0013870 | A1 | 1/2019 | Ji et al. | |
| 2020/0137468 | A1* | 4/2020 | Schimpe | H04B 10/032 |

FOREIGN PATENT DOCUMENTS

| | | |
|---|---|---|
| CN | 1936630 A | 3/2007 |
| CN | 101132237 A | 2/2008 |
| CN | 101180819 A | 5/2008 |
| CN | 201336663 Y | 10/2009 |
| CN | 105099570 A | 11/2015 |
| CN | 109157182 A | 1/2019 |
| CN | 109212663 A | 1/2019 |
| WO | 2006005981 A2 | 1/2006 |

OTHER PUBLICATIONS

"Fiber Optic Solutions", Coupler and Splitter Overview Explained, https://www.fiber-optic-solutions.com/coupler-splitter-overview.html, Jun. 9, 2016, 2 pages.

* cited by examiner

OPTICAL SOURCE SWITCHING METHOD AND APPARATUS

CROSS-REFERENCE TO RELATED APPLICATIONS

This application is a continuation of U.S. patent application Ser. No. 17/540,699, filed on Dec. 2, 2021, which is a continuation of International Application No. PCT/CN2020/083401, filed on Apr. 5, 2020, which claims priority to Chinese Patent Application No. 201910477070.9, filed on Jun. 3, 2019. All of the aforementioned patent applications are hereby incorporated by reference in their entireties.

TECHNICAL FIELD

The embodiments relate to the field of optical components, an optical source switching method, and an apparatus.

BACKGROUND

An optical network device includes key components such as an optical transmitter, an optical receiver, a wavelength division multiplexer, and a wavelength division demultiplexer. The optical transmitter or the optical receiver may be packaged into a module, which is referred to as an optical module. A silicon photonics technology has an advantage of high integration, and especially in implementation of a multi-channel optoelectronic device, has advantages such as low power consumption and low packaging costs. Therefore, the silicon photonics technology is considered as one of important trends in development of next-generation optoelectronic devices.

Currently, a common technical manner for resolving an optical module failure problem is to replace a failed optical module with a new optical module. However, as a quantity of channels included in an optical module based on the silicon photonics technology gradually increases, a more efficient replacement solution is urgently required.

SUMMARY

In view of this, embodiments herein provide an optical source switching solution to implement more efficient replacement of a failed component.

According to a first aspect, an embodiment provides an optical source switching apparatus. The apparatus includes one or more first optical sources, an optical cross-connect device, one or more second optical sources, and at least one first coupler, where:

the optical cross-connect device is connected to the one or more first optical sources, the optical cross-connect device is further connected to the first coupler, and the first coupler is connected to the second optical source; and both the first optical source and the second optical source are configured to output continuous optical energy, and the optical cross-connect device is configured to enable optical energy output by at least one of the one or more first optical sources to enter the first coupler when at least one of the one or more second optical sources fails; and the first coupler is configured to implement beam splitting of the optical energy of the first optical source and/or the second optical source.

The "connection" mentioned in this embodiment includes a direct or indirect connection, and may be a connection through a port, or may be a connection on an optical path.

In a first possible implementation of the first aspect, the apparatus further includes at least one first optical modulator, the first optical modulator is connected to the first coupler, and the first optical modulator is configured to modulate optical energy.

With reference to the first aspect and the first possible implementation of the first aspect, in a second possible implementation of the first aspect, the apparatus further includes at least one first optical detector, the first optical detector is connected to the first coupler, and the first optical detector is configured to detect optical power output by the first coupler.

With reference to the first aspect and the first to the second possible implementations of the first aspect, in a third possible implementation of the first aspect, the apparatus further includes at least one second coupler, and the second coupler is connected to the first coupler.

With reference to the first aspect and the first to the third possible implementations of the first aspect, in a fourth possible implementation of the first aspect, the apparatus further includes at least one second optical modulator, and the second optical modulator is connected to the second coupler.

With reference to the first aspect and the first to the fourth possible implementations of the first aspect, in a fifth possible implementation of the first aspect, the apparatus further includes at least one second optical detector, and the second optical detector is connected to the second coupler. A cascaded second coupler can split optical energy into more beams, and the beams account for different proportions of the total optical energy.

With reference to the first aspect and the first to the fifth possible implementations of the first aspect, in a sixth possible implementation of the first aspect, the apparatus includes an optical absorption apparatus, the optical absorption apparatus is connected to the optical cross-connect device, and the optical absorption apparatus is configured to absorb the optical energy output by the first optical source.

With reference to the first aspect and the first to the sixth possible implementations of the first aspect, in a seventh possible implementation of the first aspect, the optical absorption apparatus includes one or more of the following: an optical attenuation fiber, an optical absorption crystal, and a blackened material, where the blackened material includes a material whose surface is blackened with a black coating.

With reference to the first aspect and the first to the seventh possible implementations of the first aspect, in an eighth possible implementation of the first aspect, the optical absorption crystal includes a Faraday crystal in an isolator.

With reference to the first aspect and the first to the eighth possible implementations of the first aspect, in a ninth possible implementation of the first aspect, the optical cross-connect device includes a Mach-Zehnder interferometer (MZI), a micro-electro-mechanical system (MEMS), and a wavelength selective switch (WSS).

According to a second aspect, an embodiment provides an optical source backup method, applied to an optical device. The optical device includes one or more first optical sources, an optical cross-connect device, one or more second optical sources, and at least one first coupler, where:

the optical cross-connect device is connected to the one or more first optical sources, the optical cross-connect device is further connected to the first coupler, and the first coupler is connected to the second optical source; both the first optical source and the second optical source are configured to output continuous optical energy, and the optical cross-connect device is configured to select at least one of the one or more first optical sources to output optical energy to the first coupler when at least one of the one or more second optical sources fails; and the first coupler is configured to implement beam splitting of the optical energy output by the first optical source and/or the second optical source; and the method includes:

detecting, by the optical device, that at least one of the one or more second optical sources fails; and outputting an optical path switching signal to the optical cross-connect device, where the optical path switching signal is used to instruct the optical cross-connect device to establish an optical path on a link on which at least one first optical source and the at least one failed second optical source are located, so that optical energy output by the at least one first optical source enters the first coupler.

In a first possible implementation of the second aspect, after the detecting, by the optical device, that at least one of the one or more second optical sources fails, the method further includes: starting at least one of the one or more first optical sources. This implementation is applicable to a case in which a first optical source is started after a failure is detected in a second optical source.

With reference to the second aspect and the first possible implementation of the second aspect, in a second possible implementation of the second aspect, before the detecting, by the optical device, that at least one of the one or more second optical sources fails, the method further includes: starting at least one of the one or more first optical sources. This implementation is applicable to a case in which a first optical source is started before a failure occurs in a second optical source. An advantage of this implementation is that a start time of the optical source is saved, and a backup optical source may be quickly used to replace a failed working optical source.

With reference to the second aspect and the first to the second possible implementations of the second aspect, in a third possible implementation of the second aspect, the optical device further includes an optical absorption apparatus, the optical absorption apparatus is placed outside an optical chip or placed inside an optical chip, the optical absorption apparatus is connected to the optical cross-connect device, and the optical absorption apparatus is configured to absorb optical energy output by the at least one first optical source.

With reference to the second aspect and the first to the third possible implementations of the second aspect, in a fourth possible implementation of the second aspect, the first optical source, the optical cross-connect device, and the first coupler are placed in one optical chip, and the second optical source is placed outside the optical chip.

With reference to the second aspect and the first to the fourth possible implementations of the second aspect, in a fifth possible implementation of the second aspect, the second optical source, the optical cross-connect device, and the first coupler are placed in one optical chip, and the first optical source is placed outside the optical chip.

With reference to the second aspect and the first to the fifth possible implementations of the second aspect, in a sixth possible implementation of the second aspect, the optical cross-connect device and the first coupler are placed in one optical chip, and both the first optical source and the second optical source are placed outside the optical chip.

With reference to the second aspect and the first to the sixth possible implementations of the second aspect, in a seventh possible implementation of the second aspect, the first optical source, the second optical source, the optical cross-connect device, and the first coupler are placed in one optical chip.

With reference to the second aspect and the first to the seventh possible implementations of the second aspect, in an eighth possible implementation of the second aspect, the optical chip further includes one or more of the following components: at least one optical modulator, at least one second coupler, and at least one optical detector, the second coupler is connected to the first coupler, the first optical modulator is connected to the first coupler, and the first optical detector is connected to the first coupler.

With reference to the second aspect and the first to the eighth possible implementations of the second aspect, in a ninth possible implementation of the second aspect, the detecting, by the optical device, that at least one of the one or more second optical sources fails includes:

determining that at least one of the one or more second optical sources fails when the optical device detects that a current of the at least one second optical source is less than a preset threshold; or determining that at least one of the one or more second optical sources fails when an optical detector is disposed on a back side of the second optical source and the optical device detects that optical power of optical energy output by an optical detector connected to the at least one second optical source is less than a preset threshold.

With reference to the second aspect and the first to the ninth possible implementations of the second aspect, in a tenth possible implementation of the second aspect, the optical chip further includes at least one first optical detector, the first optical detector is connected to the first coupler, and the detecting, by the optical device, that at least one of the one or more second optical sources fails includes:

determining that the first optical detector detects whether a current of at least one of the one or more second optical sources is less than a preset threshold; and determining that at least one of the one or more second optical sources fails when the first optical detector detects that a current of the at least one second optical source is less than the preset threshold.

With reference to the second aspect and the first to the tenth possible implementations of the second aspect, in an eleventh possible implementation of the second aspect, the optical chip further includes at least one second optical modulator, the second optical modulator is connected to the second coupler, and the second optical modulator is configured to modulate optical energy.

With reference to the second aspect and the first to the eleventh possible implementations of the second aspect, in a twelfth possible implementation of the second aspect, the optical chip further includes at least one second optical detector, the second optical detector is connected to the second coupler, and the detecting, by the optical device, that at least one of the one or more second optical sources fails includes:

determining that the second optical detector detects whether a current of at least one of the one or more second optical sources is less than the preset threshold; and determining that at least one of the one or more second optical sources fails when the second optical detector detects that a current of the at least one second optical source is less than the preset threshold.

With reference to the second aspect and the first to the twelfth possible implementations of the second aspect, in a thirteenth possible implementation of the second aspect, the method further includes: replacing the at least one failed second optical source with another at least one optical source.

With reference to the second aspect and the first to the thirteenth possible implementations of the second aspect, in a fourteenth possible implementation of the second aspect, the method further includes: outputting another optical path switching signal to the optical cross-connect device, so that optical energy output by the another at least one optical source enters the first coupler.

According to the optical source switching apparatus and method provided in the embodiments, when at least one second optical source is faulty, the optical cross-connect device is controlled to replace the faulty second optical source with the first optical source to continue to output optical energy, thereby implementing quick switching and replacement of the optical source. The optical source switching apparatus provided in the embodiments can greatly improve reliability of the optical source, and greatly reduce overall costs compared with an existing solution.

BRIEF DESCRIPTION OF THE DRAWINGS

To describe the solutions in the embodiments more clearly, the following briefly describes the accompanying drawings required for describing the background and the embodiments. The accompanying drawings in the following describe merely some embodiments, and a person of ordinary skill in the art may still derive other accompanying drawings or embodiments according to these drawings or descriptions without creative efforts.

DETAILED DESCRIPTION OF THE EMBODIMENTS

The device form and the service scenario described in the embodiments are intended to describe solutions of the embodiments more clearly, and do not constitute a limitation on the solutions provided in the embodiments. A person of ordinary skill in the art may understand that, with evolution of a device form and emergence of a new service scenario, the solutions provided in the embodiments are also applicable to similar problems.

The solutions provided in the embodiments may be applicable to different service scenarios, including, but not limited to, a backbone optical transmission network, an optical access network, short-distance optical interconnection, wireless service front-haul/back-haul, and the like.

Figure 1:
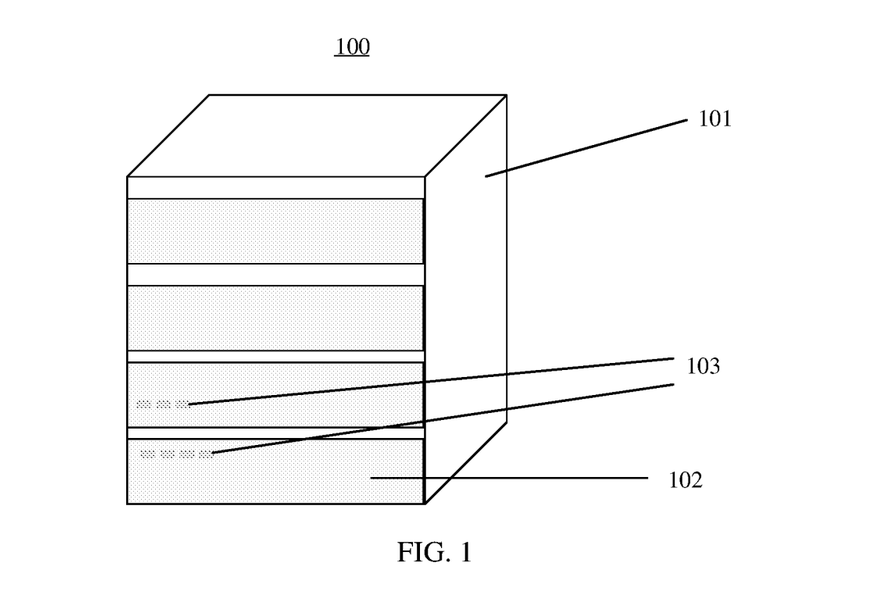
FIG. 1 is a schematic structural diagram of a possible optical communications device.

FIG. 1 is a schematic structural diagram of a possible optical communications device. As shown in FIG. 1, the device 100 includes a subrack 101 and a board 102. The subrack 101 has one or more slots that are configured to secure the board 102. The board 102 has an electrical connector 103 configured to connect to an electrical connection interface of an optical module. The optical communications device may include one or more types of boards to implement functions such as processing, transmission, and exchange of client service data. The optical module is one of the components of the optical communications device and is configured to send the client service data by carrying the client service data in an optical signal and/or obtain the client service data by parsing an optical signal. When an optical module has only a sending function, the optical module may be referred to as a transmitter optical sub-assembly (TOSA). When an optical module has only a capability of receiving and detecting an optical signal, the optical module may be referred to as a receiver optical sub-assembly (ROSA). An optical module having both a sending function and a receiving function is referred to as a bi-directional optical aub-assembly (BOSA). One end of the optical module is an electrical connection interface and is configured to connect to an electrical connection interface on the board. An opposite end of the optical module is an optical interface, and is configured to connect to an optical fiber, to implement connection to another optical communications device in a network or connection between different boards of a same device.

The optical module may be inserted into the electrical connector 103 on the board 102 to work. Once the optical module fails, the failed optical module may be pulled out and replaced with a new optical module, to restore a normal working state of the optical communications device. This manner is applicable to an optical module with a small quantity of channels, for example, a single-channel or dual-channel optical module. With development of a silicon photonics technology, the quantity of channels of the optical module gradually increases, for example, increases to eight channels or even 16 channels. A conventional solution of directly discarding a failed optical module has some limitations. First, as the quantity of channels increases, a quantity of components (for example, optical modulators) in a corresponding optical module also needs to increase correspondingly. Therefore, costs of the optical module increase, and discarding costs increase greatly than before. Second, failure rates of different components in the optical module vary greatly. Therefore, a component with a high failure rate becomes a bottleneck of a lifespan of the optical module. A failure rate of an optical source in the optical module is substantially higher than that of another component (for example, an optical modulator, a multiplexer, or a demultiplexer) of the optical module. As the quantity of channels increases, an optical source failure becomes a main cause of an optical module failure. Third, different components are packaged into one module, resulting in an increase in an operating temperature of the components in the module, and shortening a lifespan of the components (such as the optical source). Therefore, a more efficient solution is urgently needed to resolve the problem of the optical module failure caused by the optical source failure in the current solution.

It should be noted that the optical modulator is configured to load an electrical signal to optical energy and output the optical energy (which may also be referred to as an optical signal) carrying the signal. A form in which the electrical signal is loaded to the optical energy may change a phase, an amplitude, or the like of the optical energy.

It should be noted that the terms "first", "second", and the like are used to distinguish between similar objects but do not necessarily indicate an order or sequence. It should be understood that the data termed in such a way is interchangeable in proper cases, so that the embodiments described herein can be implemented in orders not described. The term "and/or" is used to describe an association relationship between associated objects and indicates that three relationships may exist. For example, A and/or B may represent the following three cases: only A exists, both A and B exist, and only B exists. An operation method in method embodiments may also be applied to apparatus embodiments. In addition, to more clearly reflect a relationship between components in different embodiments, a same reference numeral is used to represent components with a same function or similar functions in different embodiments.

It should be further noted that, unless otherwise specified, descriptions for some features in one embodiment may also be used to explain corresponding features mentioned in other embodiments. For example, an optical cross-connect device in an embodiment may be applicable to optical cross-connect devices in all other embodiments.

Figure 2:
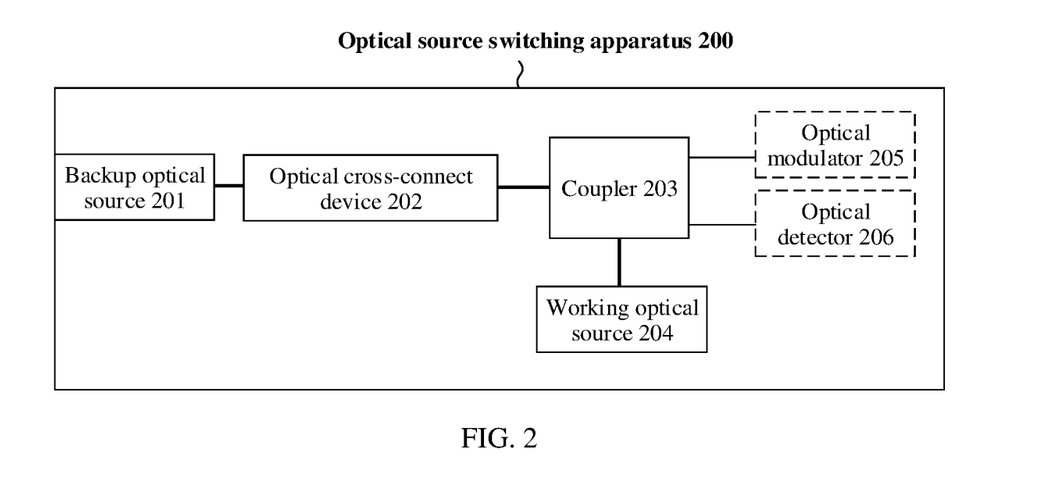
FIG. 2 is a schematic structural diagram of an optical source switching apparatus according to an embodiment.

FIG. 2 is a schematic structural diagram of an optical source switching apparatus 200 according to an embodiment. As shown in FIG. 2, the optical source switching apparatus 200 includes a backup optical source 201, an optical cross-connect device 202, a coupler 203, and a working optical source 204. The backup optical source 201 is connected to the optical cross-connect device 202, the optical cross-connect device 202 is further connected to the coupler 203, and the working optical source 202 is connected to the coupler 203. In a normal working state, the working optical source 204 inputs continuous optical energy to the coupler 203. In this case, the coupler 203 is configured to implement beam splitting of optical energy output by the working optical source 204. When the working optical source 204 fails, the backup optical source 201 is started, and then an optical path switching signal is input to the optical cross-connect device 202. After receiving the optical path switching signal, the optical cross-connect device 202 establishes an optical path on a link on which the started backup optical source 201 and the failed working optical source 204 are located. In this way, optical energy output by the started backup optical source 201 enters the coupler 203, and the coupler 203 implements beam splitting of the optical energy output by the backup optical source 201. In this case, a process of quickly replacing the failed working optical source 204 with the backup optical source 201 is implemented, and reliability of the optical source is improved.

Optionally, the coupler 203 may be further connected to an optical modulator 205, and the optical modulator 205 is configured to modulate optical energy. The coupler 203 may be further connected to an optical detector 206. The optical detector 206 is configured to detect output power of the coupler 203. Further, by detecting the output power of the coupler 203, the optical detector 206 may detect that the working optical source 204 fails. When the optical source fails, the optical source cannot continuously and stably input optical energy or cannot input optical energy at normal power.

Optionally, the optical cross-connect device 202 may be a Mach-Zehnder interferometer (MZI), a micro-electromechanical system (MEMS), or a wavelength selective switch (WSS). The optical cross-connect device 202 may be an optical cross-connect chip alone.

It should be noted that the "connection" mentioned in this embodiment includes a direct or indirect connection, and may be a connection through a port, or may be a connection on an optical path. A person of ordinary skill in the art may understand that an optical component may not necessarily have a physical connection relationship of substantial contact, but a spatial location of the optical component and a component feature of the optical component make the optical component form a connection relationship on an optical path.

Figure 3:
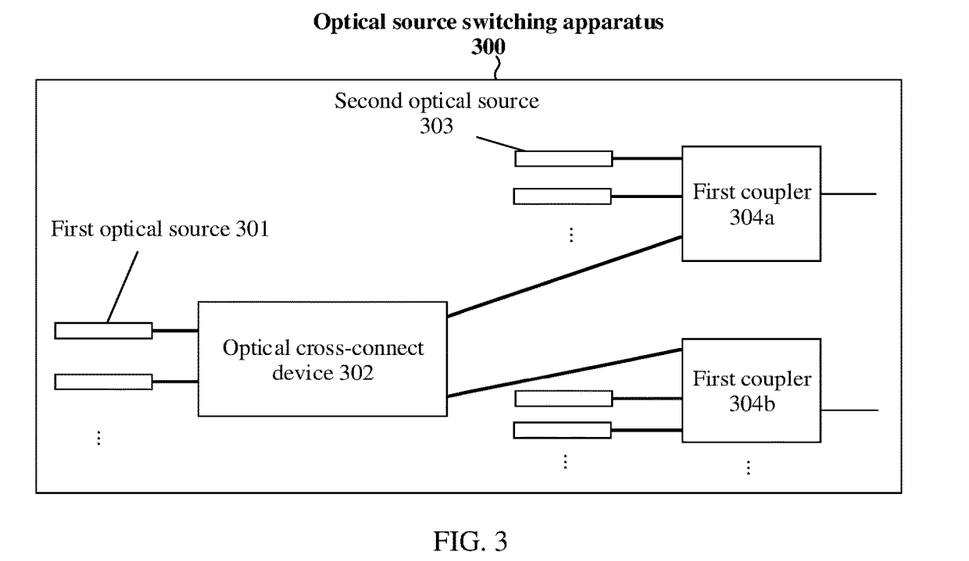
FIG. 3 is a schematic structural diagram of another optical source switching apparatus according to an embodiment.
Figure 4:
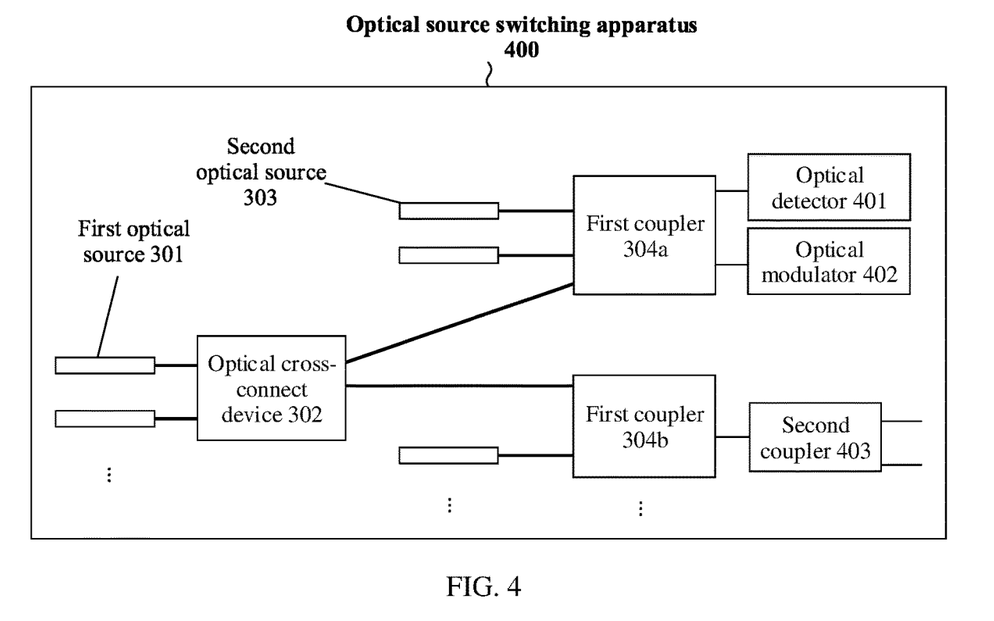
FIG. 4 is a schematic structural diagram of still another optical source switching apparatus according to an embodiment.
Figures 5, 6A:
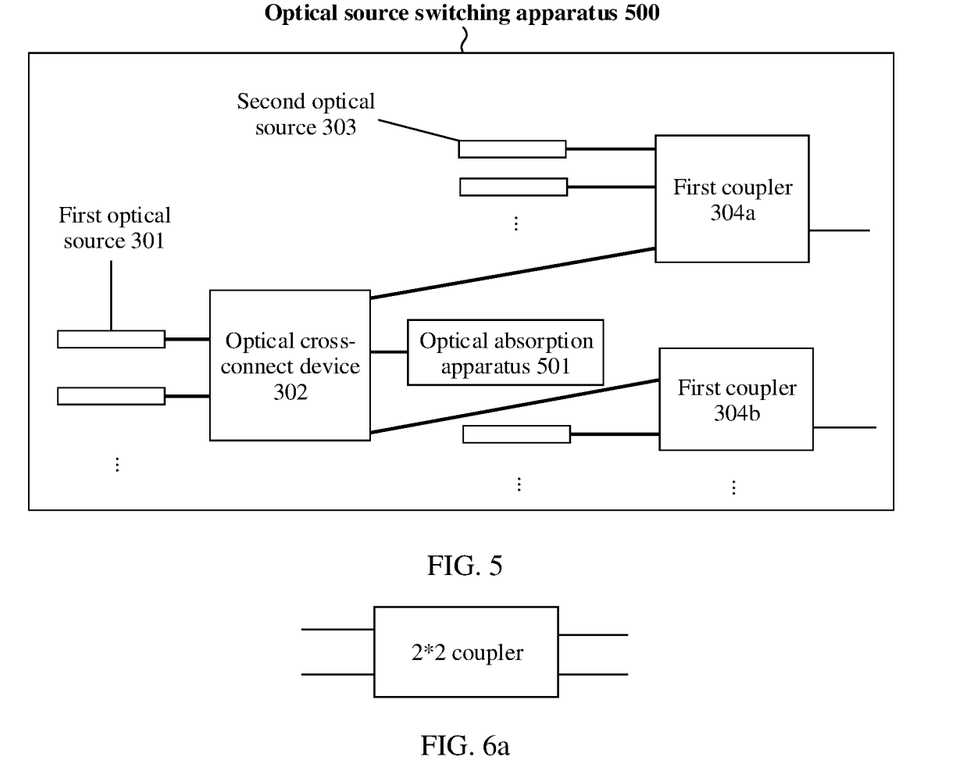
FIG. 5 is a schematic structural diagram of yet another optical source switching apparatus according to an embodiment.
FIG. 6a is a schematic structural diagram of a 2×2 coupler according to an embodiment.

FIG. 3 is a schematic structural diagram of another optical source switching apparatus 300 according to an embodiment. As shown in FIG. 3, the optical source switching apparatus 300 includes a first optical source 301, an optical cross-connect device 302, a second optical source 303, and at least one first coupler (304a and 304b are any two of the at least one first coupler). In the embodiments, FIG. 3 to FIG. 5 show only the first coupler 304a and the first coupler 304b as an example. In some embodiments, there may be more first couplers, or there may be only one of the first coupler 304a and the first coupler 304b. The first coupler 304a and the first coupler 304b are merely intended to describe a difference. The first coupler 304a and the first coupler 304b may be the same or may be different. This is not limited in the embodiments.

The optical cross-connect device 302 is connected to one or more first optical sources 301, the optical cross-connect device 302 is further connected to the first couplers (304a and 304b), and the first coupler 304a and the first coupler 304b each may be input optical energy by one or more second optical sources 303. In a normal working state, the second optical sources 303 input continuous optical energy to the first couplers (304a and 304b). In this case, the first couplers (304a and 304b) are configured to implement beam splitting of the optical energy output by the second optical sources. When an optical source in the second optical sources 303 fails, at least one first optical source 301 is started, and the optical cross-connect device 302 selects the started first optical source 301 to continue to output optical energy to the first coupler 304. In this case, the first couplers (304a and 304b) are configured to implement beam splitting of the optical energy output by the first optical source and/or the second optical source. Subsequently, a new optical source may be used to replace the failed second optical source, and the first optical source is turned off in case that the second optical source fails again. Herein, that the first coupler is configured to implement beam splitting of the optical energy output by the first optical source and/or the second optical source includes the following three cases. (1) The first coupler is configured to implement beam splitting of optical energy output by the first optical source: all the second optical sources fail, all the second optical sources are replaced by the first optical sources, and all optical energy received by the first coupler is from the first optical source. (2) The first coupler is configured to implement beam splitting of optical energy output by the second optical source: all the second optical sources are normal, no failure occurs, and all optical energy received by the first coupler is from the second optical source. (3) The first coupler is configured to implement beam splitting of optical energy output by the first optical source and the second optical source: the optical source switching apparatus has a plurality of second optical sources, and some of the second optical sources fail and are replaced by the first optical sources. In this case, some optical energy received by the first coupler is from the first optical source, and some is from the second optical source.

Optionally, the first optical source 301, the optical cross-connect device 302, and the first coupler 304 are placed in one optical chip, and the second optical source 303 is placed outside the optical chip.

Optionally, the second optical source 303, the optical cross-connect device 302, and the first coupler 304 are placed in one optical chip, and the first optical source 301 is placed outside the optical chip.

Optionally, the optical cross-connect device 302 and the first coupler 304 are placed in one optical chip, and both the first optical source 301 and the second optical source 303 are placed outside the optical chip.

Optionally, the first optical source 301, the second optical source 303, the optical cross-connect device 302, and the first coupler 304 are all placed in one optical chip.

The optical chip may further include one or more of the following components: at least one optical modulator and at least one optical detector.

It should be noted that the optical chip mentioned in the embodiments may be a silicon photonic chip, or may be a quartz chip, a silicon nitride chip, an InP (indium phosphide) chip, or an optical chip of another type of material that may be implemented in the future. This is not limited in the embodiments.

The coupler mentioned in this embodiment may be any one of the following four types: a multimode coupler, a Y-branch coupler, a directional coupler, and a micro-electro-mechanical system (MEMS). The multimode coupler may be integrated into a chip. Any component that can implement a function of the coupler in the embodiment may be applicable to the optical source switching apparatus provided in the embodiments. This is not limited in the embodiments.

According to the optical source switching apparatus provided in this embodiment, when a second optical source fails, the optical cross-connect device is controlled to replace the failed second optical source with the first optical source to continue to output optical energy, thereby implementing quick switching and replacement of the optical source. After the failed second optical source is replaced with a new optical source module, the optical cross-connect device may switch back to the new optical source module to output optical energy. The optical source switching apparatus provided in this embodiment can greatly improve reliability of the optical source and greatly reduce overall costs compared with an existing solution.

FIG. 4 is a schematic structural diagram of still another optical source switching apparatus 400 according to an embodiment. As shown in FIG. 4, descriptions of a first optical source 301, an optical cross-connect device 302, and a second optical source 303 of the optical source switching apparatus 400 in FIG. 4 are the same as the corresponding descriptions of the first optical source 301, the optical cross-connect device 302, and the second optical source 303 of the optical source switching apparatus 300 in FIG. 3. Refer to related descriptions of the embodiment corresponding to FIG. 3, and details are not described herein again.

A difference between the embodiment corresponding to FIG. 4 and the embodiment corresponding to FIG. 3 lies in that, the optical source switching apparatus 400 may include at least one optical modulator 402, the optical modulator 402 is connected to a first coupler 304a, and the optical modulator 402 is configured to modulate optical energy. The optical source switching apparatus 400 may further include at least one optical detector 401, and the optical detector 401 is connected to the first coupler 304a. The first coupler 304a or a first coupler 304b is an example of a first coupler. Further, in some embodiments, there may be one or more first couplers, and the first coupler may be any one of the first couplers 304a and 304b.

Optionally, the first coupler 304a may be connected to both the optical detector 401 and the optical modulator 402. Alternatively, the first coupler 304a may be connected only to the optical modulator 402. In this case, the other unused port of the first coupler 304a is used as an end pin. Alternatively, the first coupler 304a may be connected only to the optical detector 401. In this case, the other unused port of the first coupler 304a is used as an end pin. The optical detector may be a photodiode (PD) or an avalanche photodiode (APD).

A difference between the embodiment corresponding to FIG. 4 and the embodiment corresponding to FIG. 3 further lies in that, the optical source switching apparatus 400 may further include a second coupler 403, and the first coupler 304b may be connected to one or more second couplers 403 (only one second coupler is shown in FIG. 4). The second coupler 403 may split optical energy into more beams. For example, the first coupler 304b splits one beam of optical energy into two beams. A beam splitting ratio may be applicable as the two beams of optical energy obtained through splitting may be different, for example, one beam of the optical energy occupies 10% of the optical energy, the other beam occupies 90% of the optical energy. A second coupler is installed on each of branches in which the two beams of optical energy split by the first coupler are located, and each second coupler can split one beam into two beams again, which may have a beam splitting ratio. In this case, one beam is split into four beams in a process of inputting the optical energy to the first coupler and finally outputting the optical energy through output ports of the second coupler, where the four beams may occupy different proportions of the total optical energy received by the first coupler. By analogy, one beam is split into eight beams, one beam is split into sixteen beams, and the like may also be implemented. The second coupler 403 may be the same as the first coupler 304a or 304b.

Optionally, the second coupler 403 may be connected to a second optical detector or a second optical modulator.

FIG. 5 is a schematic structural diagram of yet another optical source switching apparatus according to an embodiment. As shown in FIG. 5, descriptions of a first optical source 301, a second optical source 303, and first couplers (304a and 304b) of the optical source switching apparatus 500 in FIG. 5 are the same as the corresponding descriptions of the first optical source 301, the second optical source 303, and the first couplers (304a and 304b) of the optical source switching apparatus 300 in FIG. 3. Refer to related descriptions of the embodiment corresponding to FIG. 3, and details are not described herein again.

A difference between the embodiment corresponding to FIG. 5 and the embodiment corresponding to FIG. 3 lies in that, the optical source switching apparatus 500 may include an optical absorption apparatus 501, the optical absorption apparatus 501 is connected to an optical cross-connect device 302, and the optical absorption apparatus 501 is configured to absorb optical energy output by the first optical source 301.

For example, the optical absorption apparatus 501 is a passive device, and is configured to absorb optical energy output by a first optical source that is in a started state but is not used to replace a failed second optical source. For example, before at least one second optical source 303 fails, M first optical sources 301 are started (M and N are positive integers, and M is greater than or equal to N). In this case, because the second optical source 303 works normally and the first optical source 301 does not need to output optical energy, the optical absorption apparatus 501 is used to absorb optical energy output by the M started first optical sources 301. At a subsequent moment, N second optical sources 303 fail (M and N are positive integers, and M is greater than or equal to N). In this case, the optical cross-connect device 302 switches an optical path, and N of the M started first optical sources 301 are used to replace the failed N second optical sources 303 to continue to output optical energy to the first couplers (304a and 304b). In this case, (M−N) started first optical sources 301 are not used to replace the failed second optical source 303 to output optical energy, so that optical energy output by the (M−N) started first optical sources 301 that are not used to replace the failed second optical source continues to be absorbed by the optical absorption apparatus 501.

Optionally, the optical absorption apparatus may include one or more of the following three possibilities: an optical attenuation fiber, an optical absorption crystal, and a blackened material. The optical absorption crystal includes a Faraday crystal in an isolator, and the blackened material includes a material whose surface is blackened with a black coating.

Figure 6B:
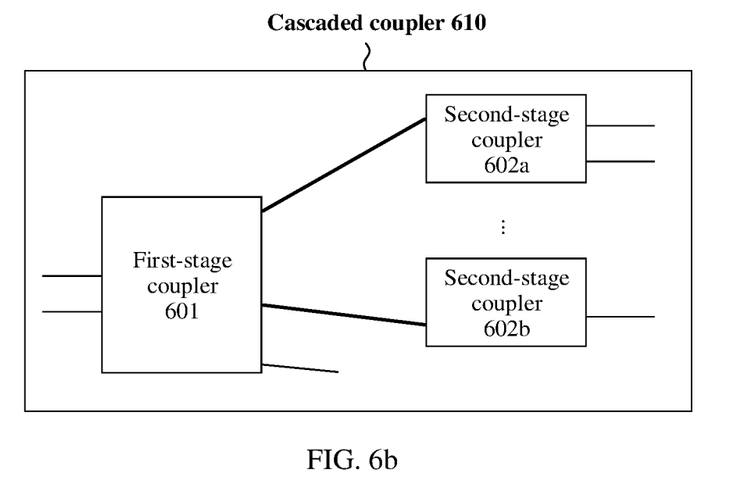
FIG. 6b is a schematic structural diagram of a cascaded coupler according to an embodiment.
Figure 6C:
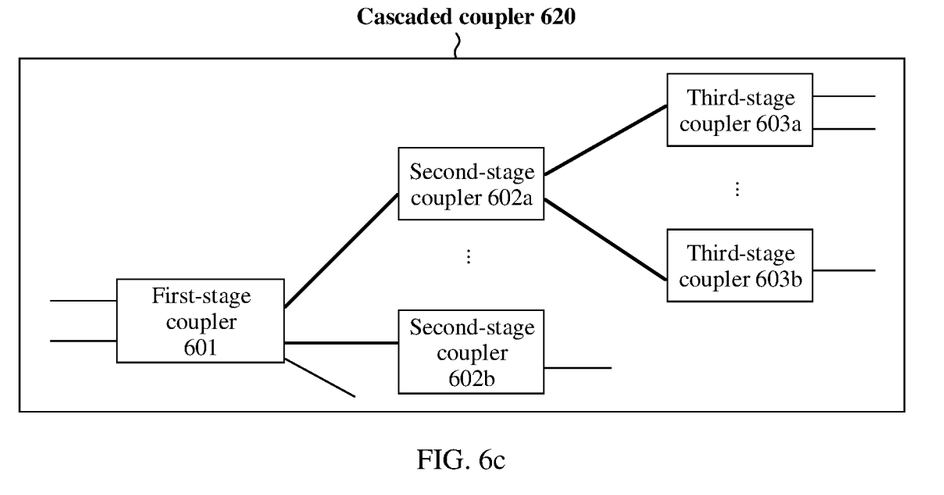
FIG. 6c is a schematic structural diagram of another cascaded coupler according to an embodiment.

FIG. 6 includes FIG. 6a to FIG. 6c. FIG. 6 is a schematic structural diagram of a coupler according to an embodiment. FIG. 6a is a schematic structural diagram of a 2×2 coupler according to an embodiment. As shown in FIG. 6a, the 2×2 coupler includes four ports: two input ports and two output ports. It should be noted that the input port or the output port of the coupler described in this embodiment is merely an example and is a representative of the type of port. However, it may be appreciated that there may be one or more ports. It may also be understood that a coupler to which a related port is added on a basis of the coupler described in this embodiment shall fall within the scope of the embodiments.

Referring to the descriptions of the embodiments corresponding to FIG. 3 and FIG. 4, the two input ports of the 2×2 coupler may be connected to the optical cross-connect device 302 and the second optical source 303, and the two output ports may be connected to the optical modulator, the optical detector, or the second coupler 403. Any one of the at least one first coupler (304a and 304b are any two of the at least one first coupler) mentioned in the embodiment corresponding to FIG. 3 in the embodiments may be the 2×2 coupler correspondingly described in FIG. 6a.

FIG. 6b is a schematic structural diagram of a cascaded coupler 610 according to an embodiment. The cascaded coupler 610 includes a first-stage coupler 601 and a plurality of second-stage couplers (602a and 602b are any two of the second-stage couplers). FIG. 6b shows only the second-stage coupler 602a and the second-stage coupler 602b as an example. In some embodiments, the first-stage coupler 601 may be connected to more second-stage couplers.

Referring to the descriptions of the embodiments corresponding to FIG. 3 to FIG. 5, two input ports of the first-stage coupler may be connected to the optical cross-connect device 302 and the second optical source 303, and an output port of the first-stage coupler may further be connected to, in addition to the second-stage coupler, the optical detector or the optical modulator, or reserve an end pin. The second-stage coupler may be connected to the optical modulator or the optical detector, or reserve an end pin.

It should be noted that any one of the at least one first coupler (304a and 304b are any two of the at least one first coupler) mentioned in the embodiment corresponding to FIG. 3 may be the cascaded coupler 610 correspondingly described in FIG. 6b. Referring to the descriptions of the embodiment corresponding to FIG. 4, any one of the at least one first coupler (304a and 304b are any two of the at least one first coupler) may alternatively be only the first-stage coupler 601 in the cascaded coupler 610. In this case, the second coupler 403 is a second-stage coupler.

FIG. 6c is a schematic structural diagram of another cascaded coupler 620 according to an embodiment. The cascaded coupler 620 includes a first-stage coupler 601, a plurality of second-stage couplers (602a and 602b are any two of the second-stage couplers), and each second-stage coupler may further be connected to a plurality of third-stage couplers (603a and 603b are any two of the third-stage couplers). By analogy, each third-stage coupler may be connected to a plurality of fourth-stage couplers. In some embodiments, cascading may be performed endlessly. In this embodiment, only the three stages of couplers are drawn. Further cascading of the third-stage coupler is the same as this principle. It should be understood that further cascading shall fall within the scope of the embodiments.

Referring to the descriptions of the embodiments corresponding to FIG. 3 to FIG. 5, an input port of the first-stage coupler 601 may be connected to the optical cross-connect device 302 and the second optical source 303, and an output port of the first-stage coupler 601 may further be connected to, in addition to the second-stage couplers (602a and 602b), the optical detector or the optical modulator, or reserve an end pin. Similarly, an output port of the second-stage coupler (602a and 602b) may further be connected to, in addition to the third-stage coupler (603a and 603b), the optical detector or the optical modulator, or reserve an end pin. The third-stage coupler (603a and 603b) may be connected to the optical detector, the optical modulator, or the fourth-stage coupler.

Optionally, a structure of the fourth-stage coupler is the same as that of the third-stage coupler.

It should be noted that any one of the at least one first coupler (304a and 304b are any two of the at least one first coupler) mentioned in the embodiment corresponding to FIG. 3 in the embodiments n may be the cascaded coupler 620 correspondingly described in FIG. 6c. Referring to the descriptions of the embodiment corresponding to FIG. 4, any one of the at least one first coupler (304a and 304b are any two of the at least one first coupler) may alternatively be only the first-stage coupler 601 in the cascaded coupler 620. In this case, the second coupler 403 is a second-stage coupler (602a or 602b), and the second coupler (second-stage coupler) may be further connected to a third-stage coupler, and so on.

For functions of the optical cross-connect device, the optical modulator, and the optical detector, refer to related descriptions in the foregoing embodiments. Details are not described herein again.

The cascaded couplers described in FIG. 6b and FIG. 6c may be integrated into an optical chip.

Figure 7:
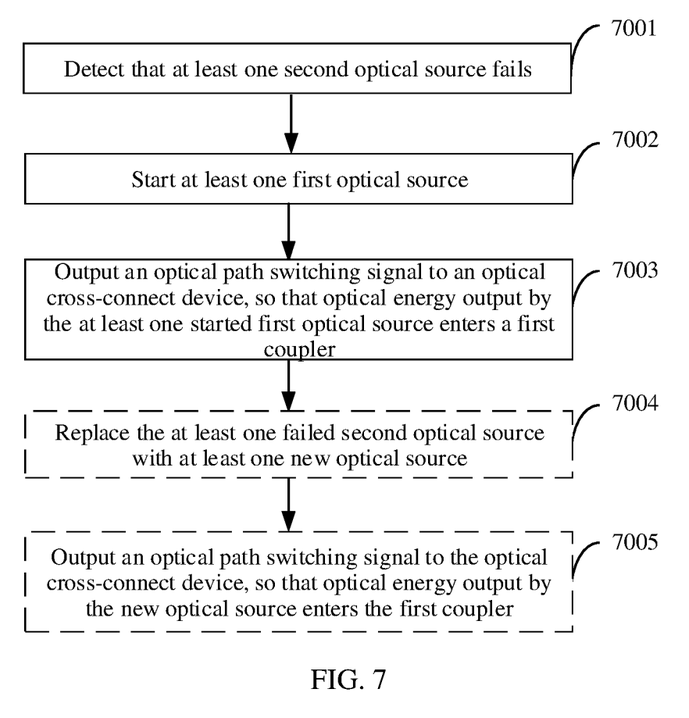
FIG. 7 is a flowchart of an optical source switching method according to an embodiment.

FIG. 7 is a flowchart of an optical source switching method according to an embodiment. The method may be applied to the optical source switching apparatus described in the embodiment corresponding to FIG. 3 or FIG. 4, or the optical source switching apparatus combined with FIG. 3, FIG. 4 and FIG. 6a to FIG. 6c. Details are not described herein again. The method includes the following steps:

Step 7001: Detect that at least one second optical source fails.

In the embodiments, an optical source may be detected in a plurality of manners.

For example, when it is detected that a current of at least one second optical source is less than a preset threshold, it is determined that the at least one second optical source fails. Alternatively, an optical detector is disposed on a back side of a second optical source, and when it is detected that optical power of optical energy output by the optical detector connected to at least one second optical source is less than a preset threshold, it is determined that the at least one second optical source fails.

In another implementation, for the case described in the embodiment corresponding to FIG. 4, it is determined whether the optical detector 401 detects that a current of at least one second optical source is less than a preset threshold. When the optical detector 401 detects that a current of at least one second optical source is less than the preset threshold, it is determined that the at least one second optical source fails.

In still another implementation, for the case described in the embodiment corresponding to FIG. 4, it is determined whether the second optical detector connected to the second coupler 403 detects that a current of at least one second optical source is less than a preset threshold. When the second optical detector detects that a current of at least one second optical source is less than the preset threshold, it is determined that the at least one second optical source fails.

Step 7002: Start at least one first optical source.

For example, if it is detected in step 7001 that K second optical sources fail, K first optical sources are started.

Step 7003: Output an optical path switching signal to an optical cross-connect device, so that optical energy output by the at least one started first optical source enters a first coupler.

In the embodiments, an optical path switching signal is output to the optical cross-connect device. The optical path switching signal is used to instruct the optical cross-connect device to establish an optical path on a link on which the at least one started first optical source and the at least one failed second optical source are located, so that optical energy output by the at least one started first optical source enters the first coupler, thereby implementing quick backup of the optical source.

Step 7004: Replace the at least one failed second optical source with at least one new optical source.

This step is an optional step and is used to ensure reliability and validity of the backup of the optical source.

Step 7005: Output another optical path switching signal to the optical cross-connect device, so that optical energy output by the new optical source enters the first coupler.

In this case, the started first optical source may be turned off for subsequent use. This step is an optional step, and whether this step is performed may be determined based on a case.

Figure 8:
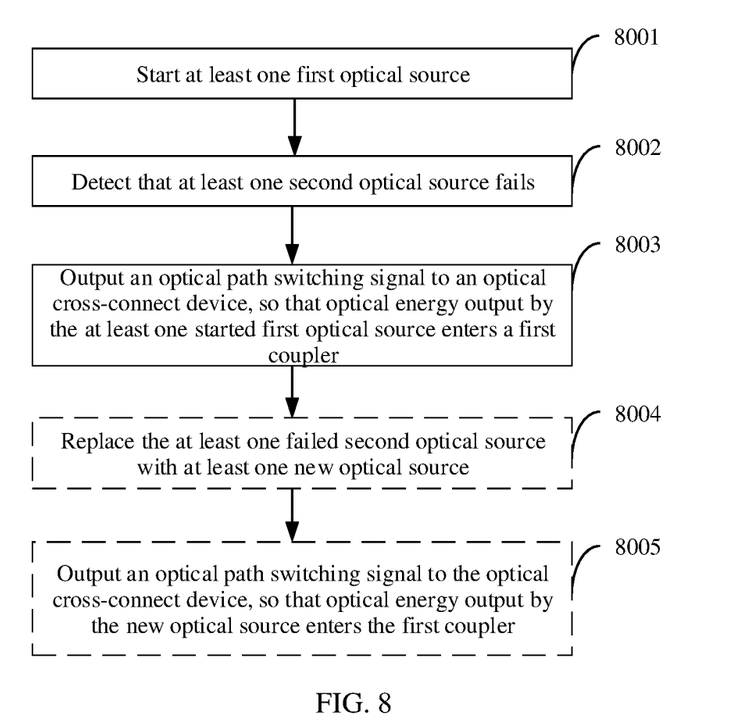
FIG. 8 is a flowchart of another optical source switching method according to an embodiment.

FIG. 8 is a flowchart of another optical source switching method according to an embodiment. The method may be applied to the optical source switching apparatus described in the embodiment corresponding to FIG. 5, the optical source switching apparatuses described in FIG. 4 and FIG. 5 in combination with the corresponding embodiments, or the optical source switching apparatuses combined with FIG. 5 and FIG. 6a to FIG. 6c. That is, the method needs an optical absorption apparatus 501, and the optical absorption apparatus 501 may be integrated into an optical chip. Details are not described herein again. The method includes the following steps:

Step 8001: Start at least one first optical source.

When a second optical source is still working normally, the at least one first optical source is started. In this way, after a failure occurs in the second optical source, the started first optical source may be directly used for backup and replacement, thereby saving time of starting the optical source. Compared with the method in FIG. 7, backup of the optical source can be implemented more quickly. For example, before any failure occurs in the second optical source, M first optical sources (M is a positive integer) are started. In this case, because the second optical source works normally and does not need the first optical source to output optical energy, the optical absorption apparatus is used to absorb optical energy output by the M started first optical sources.

Step 8002: Detect that at least one second optical source fails.

Referring to the descriptions of step 7001 in FIG. 7, details are not described herein again.

Step 8003: Output an optical path switching signal to an optical cross-connect device, so that optical energy output by the at least one started first optical source enters a first coupler.

In the embodiments, an optical path switching signal is output to the optical cross-connect device. The optical path switching signal is used to instruct the optical cross-connect device to establish an optical path on a link on which the at least one started first optical source and the at least one failed second optical source are located, so that optical energy output by the at least one started first optical source enters the first coupler, thereby implementing quick backup of the optical source. For example, at a subsequent moment, N second optical sources fail (M and N are positive integers, and M is greater than or equal to N). In this case, the optical cross-connect device switches an optical path, and N of the M started first optical sources are used to replace the failed N second optical sources to continue to output optical energy to the first coupler. In this case, (M−N) started first optical sources are not used to replace the second optical source to output optical energy, so that optical energy output by the (M−N) started first optical sources that are not used to replace the second optical source continues to be absorbed by the optical absorption apparatus.

Step 8004: Replace the at least one failed second optical source with at least one new optical source.

This step is an optional step and is used to ensure reliability and validity of the backup of the optical source.

Step 8005: Output another optical path switching signal to the optical cross-connect device, so that optical energy output by the new optical source enters the first coupler.

For example, the optical absorption apparatus may be used to continue to absorb the optical energy output by the N started first optical sources, because the failed second optical source has been replaced with the new optical source. This step is an optional step and whether this step is performed may be determined based on a case.

The embodiments may provide the optical source switching method with the optical absorption apparatus and the optical source switching method without the optical absorption apparatus. In the methods, a time for switching the optical source is shortened, reliability of the optical source is greatly improved, and overall costs are greatly reduced compared with the existing solution.

Additionally, it should be noted that the foregoing descriptions are merely implementations of the embodiments, and they are not intended to limit the scope of the embodiments. Any variation or replacement readily determined out by a person of ordinary skill in the art within the scope described in the embodiments is encompassed by the description herein.

What is claimed is:

1. An optical chip comprising:
   an optical cross-connect device;
   a first coupler, a second coupler, a first optical detector and a second optical detector;
   wherein an input of the optical cross-connect device is configured to connect to one or more first optical sources, a first output of the optical cross-connect device is connected to a first input of the first coupler, a second output of the optical cross-connect device is connected to a first input of the second coupler;
   a second input of the first coupler is configured to connect to one or more second optical sources, and a second input of the second coupler is configured to connect to the one or more second optical sources;
   an output of the first coupler is connected to the first optical detector, and an output of the second coupler is connected to the second optical detector;
   the optical cross-connect device is configured to enable optical energy output by at least one of the one or more first optical sources to enter the first coupler and the second coupler,
   wherein the first coupler is configured to output optical energy from the one or more second optical sources or the optical cross-connect device, and
   the second coupler is configured to output optical energy from the one or more second optical sources or the optical cross-connect device;
   the first optical detector is configured to detect an output of the first coupler, and the second optical detector is configured to detect an output of the second coupler.

2. The optical chip according to claim 1, further comprising:
   a first optical modulator and a second optical modulator, wherein the first optical modulator is connected to the output of the first coupler, the second optical modulator is connected to the output of the second coupler, and the first optical modulator is configured to modulate optical energy output by the first coupler, the second optical modulator is configured to modulate optical energy output by the second coupler.

3. The optical chip according to claim 1, further comprising:
   an optical absorption apparatus, wherein the optical absorption apparatus is connected to the optical cross-connect device and the optical absorption apparatus is configured to absorb optical energy output by the one or more first optical sources.

4. The optical chip according to claim 3, wherein the optical absorption apparatus comprises one or more of the following: an optical attenuation fiber, an optical absorption crystal, and a blackened material, wherein the blackened material comprises a material whose surface is blackened with a black coating.

5. The optical chip according to claim 1, wherein the optical cross-connect device comprises one or more of the following apparatuses: a Mach-Zehnder interferometer, micro-electro-mechanical systems, and a wavelength selective switch.

6. The optical modulator according to claim 1, the optical chip comprising the one or more first optical sources and the one or more second optical sources.

7. The optical chip according to claim 1, wherein the first optical detector is a photodiode (PD) or an avalanche photodiode (APD), and the second optical detector is a photodiode (PD) or an avalanche photodiode (APD).

8. An optical module comprising:
   one or more first optical sources, one or more second optical sources and an optical chip;
   the optical chip comprising: an optical cross-connect device, a first coupler, a second coupler, a first optical detector and a second optical detector;
   wherein an input of the optical cross-connect device is configured to connect to the one or more first optical sources, a first output of the optical cross-connect device is connected to a first input of the first coupler, a second output of the optical cross-connect device is connected to a first input of the second coupler;
   a second input of the first coupler is configured to connect to the one or more second optical sources, and a second input of the second coupler is configured to connect to the one or more second optical sources;
   an output of the first coupler is connected to the first optical detector, and an output of the second coupler is connected to the second optical detector;
   the optical cross-connect device is configured to enable optical energy output by at least one of the one or more first optical sources to enter the first coupler and the second coupler,
   wherein the first coupler is configured to output optical energy from the one or more second optical sources or the optical cross-connect device, and the second coupler is configured to output optical energy from the one or more second optical sources or the optical cross-connect device;
   the first optical detector is configured to detect an output of the first coupler, and the second optical detector is configured to detect an output of the second coupler.

9. A communication device comprising the optical module of claim 8, and the optical module is installed on the communication device.

10. The communication device according to claim 9, the optical module further comprising:
    at least one first optical detector, wherein the at least one first optical detector is connected to an output of the first coupler or an output of the second coupler, the at least one first optical detector is configured to detect an output of the first coupler or the second coupler.

11. The communication device according to claim 9, the optical module further comprising:
    an optical absorption apparatus, wherein the optical absorption apparatus is connected to the optical cross-connect device and the optical absorption apparatus is configured to absorb optical energy output by the one or more first optical sources.

12. The communication device according to claim 11, wherein the optical absorption apparatus comprises one or more of the following: an optical attenuation fiber, an optical absorption crystal, and a blackened material, wherein the blackened material comprises a material whose surface is blackened with a black coating.

13. The communication device according to claim 9, wherein the optical cross-connect device comprises one or more of the following apparatuses: a Mach-Zehnder interferometer, micro-electro-mechanical systems, and a wavelength selective switch.

14. The communication device according to claim 9, the optical module comprising the one or more first optical sources and the one or more second optical sources.

15. The communication device according to claim 9, wherein the first optical detector is a photodiode (PD) or an avalanche photodiode (APD), and the second optical detector is a photodiode (PD) or an avalanche photodiode (APD).

16. The optical module according to claim 8, further comprising:
   a first optical modulator and a second optical modulator, wherein the first optical modulator is connected to the output of the first coupler, the second optical modulator is connected to the output of the second coupler, and the first optical modulator is configured to modulate optical energy output by the first coupler, the second optical modulator is configured to modulate optical energy output by the second coupler.

17. The optical module according to claim 8, further comprising:
   an optical absorption apparatus, wherein the optical absorption apparatus is connected to the optical cross-connect device and the optical absorption apparatus is configured to absorb optical energy output by the one or more first optical sources.

18. The optical module according to claim 17, wherein the optical absorption apparatus comprises one or more of the following:
   an optical attenuation fiber, an optical absorption crystal, and a blackened material, wherein the blackened material comprises a material whose surface is blackened with a black coating.

19. The optical module according to claim 8, wherein the optical cross-connect device comprises one or more of the following apparatuses:
   a Mach-Zehnder interferometer, micro-electro-mechanical systems, and a wavelength selective switch.

20. The optical module according to claim 8, further comprising:
   an electrical connection interface and an optical interface.

21. The optical module according to claim 8, wherein the first optical detector is a photodiode (PD) or an avalanche photodiode (APD), and the second optical detector is a photodiode (PD) or an avalanche photodiode (APD).

* * * * *